United States Patent [19]

Nojiri et al.

[11] Patent Number: 4,832,770
[45] Date of Patent: May 23, 1989

[54] METHOD OF MANUFACTURING FOAMED POLYPROPYLENE RESIN SHEET

[75] Inventors: Akio Nojiri, Kawasaki; Hirokazu Komatsu, Kanagawa; Hidehito Shishikura, Arakawa; Masao Horiguchi, Tokyo, all of Japan

[73] Assignee: The Furukawa Electric Co. Ltd., Tokyo, Japan

[21] Appl. No.: 190,263

[22] Filed: May 2, 1988

[30] Foreign Application Priority Data

May 21, 1987 [JP] Japan .................. 62-124622

[51] Int. Cl.$^4$ ............ B32B 5/20; C08J 9/34; B29C 67/22; B29C 47/06
[52] U.S. Cl. .................. 156/78; 264/45.3; 264/45.5; 264/45.9; 264/50; 264/53; 264/54; 264/321; 264/DIG. 16; 425/113; 425/325; 425/817 C
[58] Field of Search .......... 264/DIG. 16, 53, 321, 264/45.5, 45.9, 50, 54, 45.3; 156/78; 425/113, 325, 817 C

[56] References Cited

U.S. PATENT DOCUMENTS 2,905,972  9/1959  Aykanian et al. ............ 264/321 X
2,945,261  7/1960  Aykanian et al. ............ 264/321 X

FOREIGN PATENT DOCUMENTS 33-4584  6/1978  Japan.
59-120430  7/1984  Japan.

Primary Examiner—Philip Anderson
Attorney, Agent, or Firm—Frishauf, Holtz, Goodman & Woodward

[57] ABSTRACT

According to a method of manufacturing a foamed polypropylene resin sheet of this invention, a composition comprising as a resin component a mixture of 80 to 20 wt % of a crystalline propylene-ethylene block copolymer containing 20 wt % or less of ethylene and having a melt index (MI) of 2 or less and 20 to 80 wt % of a crystalline propylene-ethylene block or random copolymer containing 5 wt % or less of ethylene and having an MI of 6 to 20 or a polypropylene homopolymer having an MI of 6 to 20 is used. A pair of molding roll dies is horizontally arranged at a point separated from the center of an apex of an extrusion foaming die when a foamed sheet is to be extrusion-molded. A distance between the center of the roll and the apex of a base lip is set to fall within a range of $(R^2+25)^{\frac{1}{2}}$ to $(R^2+144)^{\frac{1}{2}}$ where R is a radius of the molding roll die. The composition is extrusion-molded into a foamed sheet without collapsing while a fluid is supplied to the interiors of the rolls so that a surface temperature of the foamed sheet passing between the molding rolls is set at 105° C. or less. The extrusion-molded foamed sheet is cooled thereafter.

11 Claims, 3 Drawing Sheets

METHOD OF MANUFACTURING FOAMED POLYPROPYLENE RESIN SHEET

BACKGROUND OF THE INVENTION

1. Field of the Invention

The present invention relates to a method of manufacturing a smooth foamed polypropylene resin sheet having a large width of 1 m or more.

2. Description of the Related Art

Foamed polypropylene resin sheets having closed cells have been currently used in a variety of applications such as automobile interior core materials as well as boxes and storage cases as reformed products since these sheets have high rigidity.

Several methods are proposed for extrusion-molding of foamed thermoplastic resin sheet. Typical of these conventional methods are a tenter method in which a foamed sheet extruded by an extruder is taken up while being stretched widthwise and a method using a molding die with a Teflon-coated inner surface which is located near a T-die to control the outer diameter.

According to the former method, a waved sheet extruded and foamed from the T-die is expanded in the transverse direction by a tenter. It is difficult to form a sheet having a uniform thickness if the width of the sheet exceeds 1 m or more. In addition, the central portion of the sheet undesirably becomes thicker than the peripheral portion, and vertical stripes tend to be formed.

According to the latter method, it is difficult to match molding speed with that of a take-pp apparatus. If the thickness of the product is as small as 3 mm or less, it is difficult to allow proper molding because a frictional force between the inner surface of the molding die and the extruded molten resin is large.

Ween a foamed polypropylene resin sheet is manufactured according to the above typical conventional extrusion-molding for forming a foamed thermoplastic resin sheet, in addition to the above problems, the surface of the resultant foamed sheet is roughened at an expansion ratio of 2 or more. As a result, the outer appearance of the foamed sheet is worse.

Still another conventional method of manufacturing a foamed polystyrene sheet or the like is proposed in Japanese Patent Publication No. 33-4584 wherein two molding rolls are disposed adjacent to a T-die lip to form a surface of the extruded foamed sheet. This method allows easy extrusion-molding of a wide sheet. In addition, sheets can be easily formed in a wide range of thickness.

In order to develop a manufacturing method of a foamed polypropylene resin sheet having a smooth surface and an expansion ratio of 2 or more, the present inventors made extensive studies based on the method using two molding rolls disposed adjacent to the T-die lip and found that when ethylene propylene rubber was mixed in a propylene-ethylene block copolymer to prepare a composition and the composition was foamed into a sheet in such a manner that a T-die was used and small-diameter rolls were set close to the T-die to cool the two surfaces of the sheet immediately after extrusion while a distance between the rolls and an apex of a die was set at $(R^2+16)^{\frac{1}{2}}$ or less (R: radius of roll), an excellent foamed sheet was obtained (Japanese Patent Application No. 57-226930; Japanese Patent Disclosure (Kokai) No. 59-120430). In this method, however, the following problem arose when the material was processed over a long period of time while being maintained stable, into a foamed sheet having a width of 1 m or more.

In order to obtain a sheet having a width of 1 m or more, an extruder of 80 mm or more had to be used to perform extrusion while a head pressure of at least 80 kg/cm$^2$ was applied to the foamable composition. When the diameter of the roll die was 30 mm or less, the roll die tended to be deformed by the resin pressure and manufacturing of the roll itself was very difficult.

In view of this, the diameter of the roll was set at 30 mm or more, and the rolls were set closer to the T-die so as to bring the extrudate into contact with the rolls before foaming. Then, the rolls were brought into partial contact with the die, and the die was cooled. As a result, a stable foaming state could not be obtained for a long.

SUMMARY OF THE INVENTION

The present inventors made further studies under the above circumstances and reached the present invention which permite production, stable over a long time, of a very flexible and surface-smooth foamed sheet of polypropylene resin having uniform fine cells in a wide range of thickness and a width of 1 m or more by the use of a spcific polymer composition and specific extruding conditions.

The present invention provides a method of manufacturing a foamed polypropylene resin sheet having an expansion ratio of 2 or more on the basis of extrusion foaming, wherein use is made of a mixture of 80 to 20 wt % of a crystalline propylene-ethylene block copolymer containing 20 wt % or less of ethylene and having a melt index (MI) of 2 or less and 20 to 80 wt % of a crystalline propylene-ethylene block or random copolymer containing 5 wt % or less of ethylene and having an MI of 6 to 20 or a polypropylene homopolymer having an MI of 6 to 20 said method comprising; horizontally arranging a pair of molding roll dies at a point separated by a distance l from a center of an apex of an extrusion foaming die such that a distance (L) between the center of the roll of the molding roll die and an apex of a base lip is set to fall within a range of $(R^2+25)^{\frac{1}{2}}$ to $(R^2+144)^{\frac{1}{2}}$ where R is a radius of the molding roll die; extrusion-molding the composition into a foamed sheet without collapsing the surface of the sheet while a fluid is supplied to the interiors of the rolls so that a surface temperature of the foamed sheet passing between the molding rolls is set at 105° C. or less; and cooling an extrusion-molded foamed sheet.

DETAILED DESCRIPTION OF THE PREFERRED EMBODIMENTS

Figure 1:
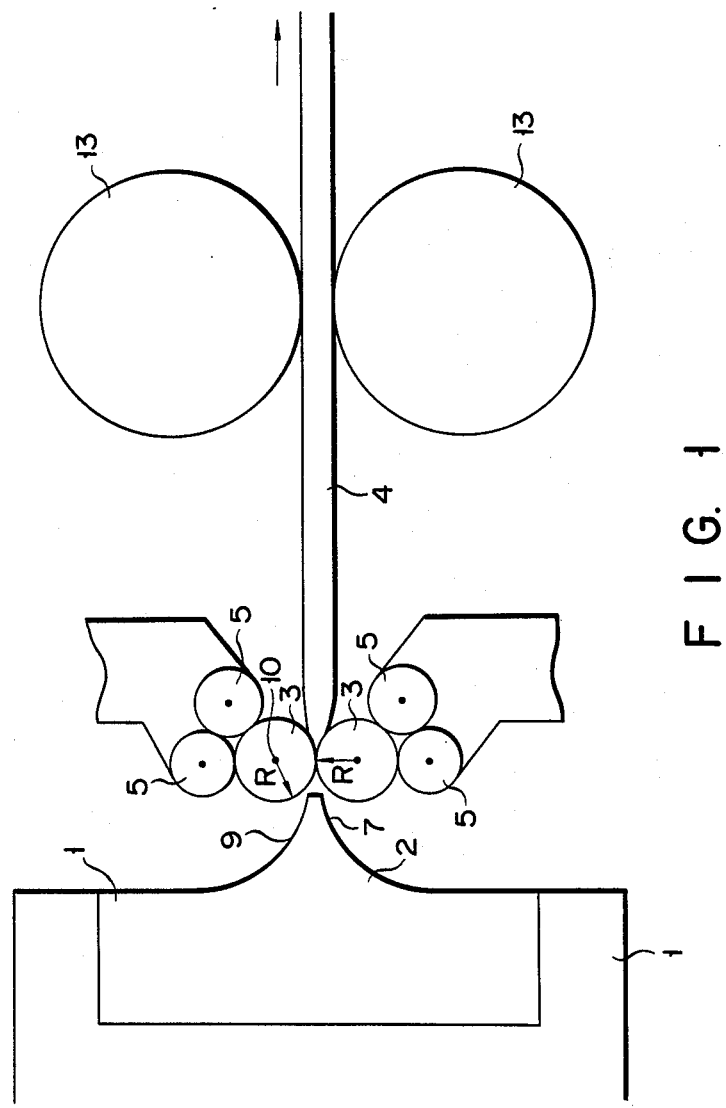
FIG. 1 is a side view showing the main part of a manufacturing apparatus used in an embodiment of the present invention.

The ethylene content of a propylene-ethylene block copolymer used in the present invention is 1 to 20 wt % and preferably 1 to 15 wt %. This block copolymer has a melt index (MI) of 2 or less. The properties of the propylene-ethylene block copolymer are defined in this manner because foamability of the foamed body is excellent when this block copolymer is used in an amount of at least 20 wt %. In addition, the propylene-ethylene block copolymer containing ethylene in the above-described amount and the melt index in the above range has excellent viscoelasticity suitable for foaming of a resin composition in a wide temperature range since a melting temperature during extrusion is relatively low. As a result, a foaming structure can be easily formed. When the properties of the propylene-ethylene block copolymer fall outside the above ranges, a foamed body having uniform microcells and a high expansion ratio cannot be obained, and the foamed body has poor physical properties and particularly low heat resistance.

According to the present invention, 20 to 80 wt % and preferably 50 to 70 wt % of a polypropylene homopolymer having an MI of 6 to 20 or of a crystalline propylene-ethylene block or random copolymer containing 5 wt % or less of ethylene and having an MI of 6 to 20 are mixed in the above propylene-ethylene block copolymer.

As described above, a polypropylene homopolymer having an MI of 6 to 20 or a crystalline propylene-ethylene block or random copolymer containing 5 wt % or less of ethylene and having an MI of 6 to 20 is mixed in the crystalline propylene-ethylene block copolymer containing 20 wt % or less of ethylene and an MI of 2 or less. This is because the distance between the apex of the die lip and the center of the roll can be increased and stable foaming for a long period of time and easier manufacturing of roll, since bigger radius being allowed and partial contact being avoided, can be performed. Furthermore, a foamed body with high impact resistance having microcells and a smooth surface can be obtained.

The polypropylene homopolymer requires strict extrusion temperature control with an allowance of ±3° C. However, the composition used in the present invention has a wide extrusion temperature range of about 160° to 195° C. so as to obtain an excellent foamed body having a high expansion ratio.

If the content of the homopolymer of propylene or the crystalline propylene-ethylene block or random copolymer containing 5 wt % or less of ethylene and having an MI of 6 to 20 is less than 20 wt %, the surface of the resultant foamed body is roughened, and the foamed body is somewhat brittle. However, if the content exceeds 80 wt %, an appropriate viscoelasticity of the resin cannot be obtained upon foaming. Cells are undesirably broken during foaming. As a result, an excellent foamed body having a high expansion ratio cannot be obtained.

Examples of the foaming agent are: a volatile foaming agent such as a lower aliphatic hydrocarbon (e.g., propane, butane, and pentane) and a halogenated hydrocarbon (e.g., monochlorodifluoromethane and trichlorodifluoromethane); an inert gas such as nitrogen gas, carbon dioxide gas, oxygen gas, and air; and a heat decomposable foaming agent such as sodium bicarbonate, ammonium bicarbonate, dinitrosopentamethylene tetramine, toluenesulfonylhydrazide, azodicarbonamide, and p-p'-oxybis-benzenesulfonylhydrazide.

The amount of the foaming agent is 0.1 to 30 parts by weight based on 100 parts by weight of a blend (to be referred to as a polymer hereinafter of the above polypropylene type resins. When a heat decomposable foaming agent is used, it is directly mixed with the polymer, and the mixture can be fed to an extruder. When a volatile foaming agent or an inert gas is used as a foaming agent, it is mixed in a melted polymer under pressure at an intermediate portion of a screw of a vent type extruder or the like.

Preferable foaming agents are inorganic gases such as carbon dioxide gas and nitrogen gas. A gas mainly containing carbon dioxide is the most preferable. When these gases are mixed with the melted resin under pressure, heat is not generated by decomposition of the foaming agent. For this reason, the resin temperature can be easily controlled, and sheet forming can be easily performed, thereby preparing a very flexible foamed sheet. The resultant foamed sheet is free from contamination and sanitarily preferable. The foamed sheet is free from brittleness and a fabrication method is free from environmental pollution when fleon gas is not used as the foaming agent. Other compounding agents may be mixed in the resin composition and are exemplified as pigments, various fillers, flame retardants, antioxidants, copper inhibitors, ultraviolet absorbers, and the like.

The present invention will be described in detail with reference to the accompanying drawings. The same reference numerals denote the same parts throughout FIGS. 1 to 5.

FIG. 1 is a side view showing the relationship between the sheet and the main part of a manufacturing apparatus used in an embodiment of the present invention. Referring to FIG. 1, reference numeral 1 denotes a base of a extrusion foaming die; 2, a base lip having a cross section shaped like the reed of a flute; and 3, a pair of rolls constituting a molding roll die. Rolls 3 are supported by auxiliary rolls 5, respectively. Curved surface 9 at the apex portion of the base lip preferably has a larger curvature radius than a roll radius of the molding roll die, thereby extending apex 7, which has an acute angle, in an extruding direction of the arrow. Each roll 3 has radius R, and distance 11 (FIG. 2) between center 10 of roll 3 and apex 7 of the lip is set at $(R^2+144)^{\frac{1}{2}}$ or less. Reference numeral 4 denotes a foamed body. Foamed body 4 is extruded from apex 7 through base lip 2. Before wave-like foaming is performed, the surfaces of the foamed body are made flat and cooled by rolls 3 so as to regulate the surface. In this manner, foaming in the direction of thickness of the sheet is allowed, while foaming in the widthwise direction is extremely restricted. Since the surface temperature of foamed body 4 is very high, cooling rolls 13 as second rolls are disposed such that their centers are separated by 50 cm or less from the center of the molding roll die which is nearest to the die, thereby cooling the foamed sheet.

Figure 2:
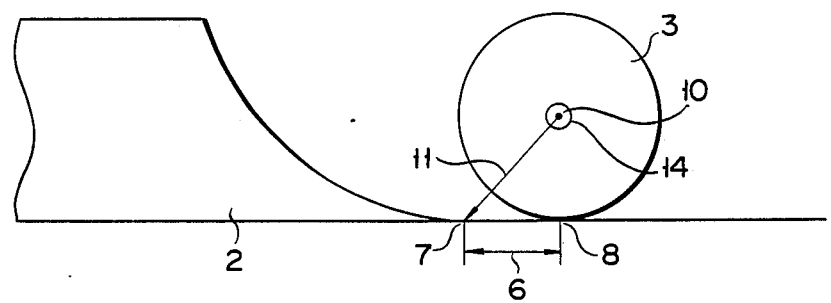
FIG. 2 is an enlarged view showing the apex of the lip and the roll contact portion in the apparatus shown in FIG. 1.
Figure 3:
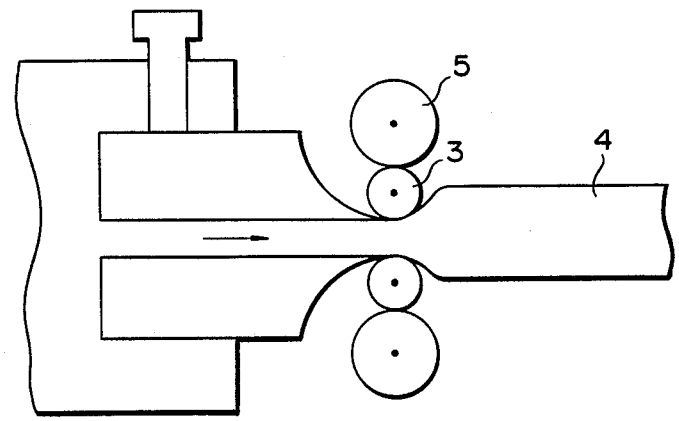
FIG. 3 is a side view showing the main part of another manufacturing apparatus used in another embodiment of the persent invention.

The apex portion of the base lip is tapered at an acute angle and the curvature radius of curve surface 9 is larger than the roll radius, as shown in FIG. 1, due to the following reason. In a conventional lip structure (FIG. 5) wherein the apex of base lip 2 in base 1 is not tapered at an acute angle, surfaces of rolls 3 are brought into contact with apex 7 of the lip, and distance 6 is formed between apex 7 of the lip and roll's sheet contact line 8. The sheet is foamed and waved while foamed body 4 passes by distance 6. In order to shorten distance 6, i.e., a path for wave-like foaming, apex 7 of the lip must be tapered at an acute angle and rolls 3 must be as close to apex 7 of the lip as possible as shown in FIGS. 1 and 2. For this purpose, the curvature radius of curved surface 9 of the lip must be larger than the roll radius. Lip 2 can have an inclined, flat surface, instead of a curved surface.

If base lip 2 has a flat surface as in a triangle structure and the lip comes closest to the rolls, the lip end face is brought into contact with the rolls. In order to assure distance 6 which inhibits wave-like foaming, distance 11 between apex 7 of the lip and center 10 of the roll 3 is set at $(R^2+144)^{\frac{1}{2}}$ or less. Basically, the radius of the molding die roll must be minimized and the roll must be as close as possible to the die. Preferably, the roll radius is set at 30 to 50 mm. If the roll radius is decreased to 30 mm or less and the roll length is increased to 1 m or more, the central portion of the roll along its axial direction tends to cause deformation of the roll. In order to prevent this, preferably auxiliary rolls are used and arranged in full or partial contact with the molding die roll to protect the molding die roll. Auxiliary rolls are represented by reference numeral 5 in FIGS. 1 and 3.

FIG. 2 is an enlarged view of apex 7 of the lip and roll's sheet contact line 8. Distance 11 between apex 7 of the lip and center 10 of the roll having radius R is set at $(R^2+144)^{\frac{1}{2}}$ or less due to the following reason. If distance 11 exceeds $(R^2+144)^{\frac{1}{2}}$, the foamed sheet is waved between apex 7 of the lip and sheet contact line 8 of each roll 3. The waved sheet cannot be corrected by rolls 3, and therefore, a flat foamed sheet cannot be obtained. Distance 6 between apex 7 of the lip and sheet contact line 8 of each roll 3 is 12 mm or less and preferably 8 mm.

Roll forming is performed when a distance from extrusion to foaming is 12 mm or less because the polymer composition used in the present invention provides a preferable result under this condition. The resin component in the present invention has high elasticity during melting and is not abruptly foamed. Therefore, during the travel time over the above distance, the foamed sheet can be cooled. The distance between apex 7 of the lip and center 10 of the roll having radius R is set at $(R^2+25)^{\frac{1}{2}}$ or more because of mechanical limitations such as machining precision of the apex of the lip and the minimum roll radius as well as strength limitations. Further, if the distance 11 is less than $(R^2+25)^{\frac{1}{2}}$, it is not preferable in terms of long-term stability for extrusion.

Figure 4:
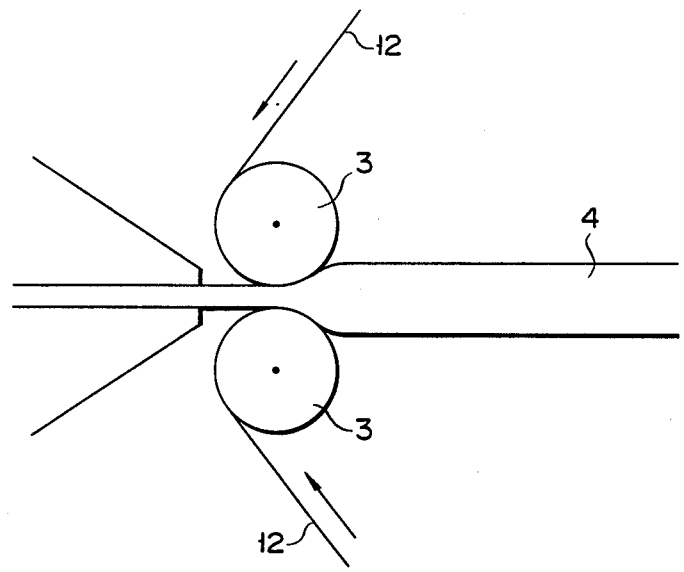
FIG. 4 is a view showing a state wherein plastic films are respectively adhered to two surfaces of a foamed sheet according to still another embodiment of the present invention.

The resin extrusion temperature is 165° to 195° C. The foamed sheet is formed by air- or water-cooled molding roll die 3. The molding roll die also aims at cooling the foamed sheet surface to be 105° C. or less. Reference numeral 14 in FIG. 2 denotes a cooling hole in the molding roll die. Upon cooling, the surface of the foamed sheet becomes smooth and whitish. If the surface temperature exceeds 105° C., the foamed sheet locally expands and a smooth sheet cannot be obtained. After the foamed sheet is cooled by the pair of molding roll dies and a predetermined period of time has elapsed, the surface temperature of the foamed sheet becomes 105° C. or higher, thereby requiring cooling. As shown in FIG. 1, cooling rolls 13 are aligned and the foamed sheet is passed and cooled between cooling rolls 13. According to the method of the present invention, films 12 are fed to the molding roll die 3, respectively. Film adhesion and foaming are simultaneously performed while the extruded foamed sheet is cooled, as shown in FIG. 4. That is, extrusion-molding of the foamed sheet is performed while films 12 are continuously fed to rolls 3. Therefore, film lamination and foaming can be simultaneously performed without difficulty.

Films 12 are adhered to both surfaces of sheet 4, as shown in FIG. 4. However, a film may be adhered to one surface of sheet 4. Alternatively, different types of film may be adhered to the upper and lower surfaces of the sheet. The present invention will be described in detail by way of its examples.

EXAMPLE 1

80 parts by weight of a crystalline propylene-ethylene block copolymer containing 10 wt % of ethylene and having an MI=1 and 20 parts by weight of a propylene-ethylene random copolymer containing 3.0 wt % of ethylene and having an MI=9.0 were dry blended. The mixture was supplied to a hopper of a extruder provided with a screw having a diameter of 100 mm, whie carbon dioxide ($CO_2$) gas as foaming agent was fed to the extruder from the vent hole at a constant flow ratio of 6.0 N l/min. 1360-mm wide sheet base 1 and an apparatus shown in FIGS. 1 and 2 were used, i.e., distance 6 between apex 7 of the lip and roll's sheet contact line 8 of molding roll die 3 having an outer diameter of 40 mm was set at 6.0 mm to extrude the mixture to obtain a foamed sheet. The foamed sheet had a thickness of 2 mm and a width of 1,375 mm. The resultant sheet had uniform microcells and an expansion ratio of 4.5 and was flat without waves.

Molding rolls each having an outer diameter of 40 mm were disposed 14 mm from the apex of the lip. Under the same conditions as in Example 1, extrusion and foaming were performed as a comparison example. The resultant sheet was undesirably waved.

EXAMPLE 2

A resin composition as in Example 1, 1050 mm wide base 1, and a method using the apparatus of FIGS. 1 and 2 were employed. Other conditions were given as follows: molding rolls 3 had an outer diameter of 30 mm each; the apex of base lip 2 had an angle of 45°; distance 6 between apex 7 of the lip and roll's sheet contact line 8 was 7.5 mm; and auxiliary rolls 5 shown in FIG. 3 were used. A flat foamed sheet having excellent dimensional precision, i.e., a thickness of 4 mm and a width of 1,090 mm was prepared. The resultant foamed sheet had uniform microcells and an expansion ratio of 4.6.

EXAMPLE 3

1.5 parts by weight of azodicarbonamide as a foaming agent was added to 60 parts by weight of a propylene-ethylene block copolymer (MI=0.5, and ethylene content: 14 wt %), 40 parts by weight of a propylene-ethylene random copolymer (MI=11, and ethylene content: 2.8%), and 15 parts by weight of ethylene propylene rubber, and these materials were dry blended. The mixture was fed to an extruder, and a foaming sheet was formed by using the 1360 mm wide base and extrusion molding roll die shown in Example 1. The resultant sheet had uniform fine cells and an expansion ratio of 3 and was flat without waves or stripes.

EXAMPLE 4

45 parts by weight of a propylene-ethylene block copolymer (MI=1.8, and ethylene content: 18 wt %) was mixed with 55 parts by weight of a propylene-ethylene random copolymer (MI=15.0, and ethylene content: 3 wt %), and 1.5 parts per hundred parts of resin (phr) of talc was added thereto. The resultant mixture was extruded by a 90 mm vent type extruder while nitrogen gas was supplied at a pressure of 45 kg/cm$^2$ (1.5 parts) to a vent portion, by using a 900mm wide base and the apparatus shown in FIGS. 1 and 2. A molding roll die having an outer diameter of 35 mm was disposed such that a distance between the apex of the lip and the roll's sheet contact line was set at 7.0 mm, thereby extrusion-molding a foamed sheet. The resultant sheet had a thickness of 3 mm, a smooth surface, and a whitish color. The foamed sheet had uniform fine cells each with a diameter of 0.3 mm or less and an expansion ratio of 5.

EXAMPLE 5

A resin composition containing 1.5 phr of a talc powder as in Example 4 was used. Following the same procedures as in Example 4, the resultant mixture was extruded and foamed using a gas. During extrusion and foaming, polypropylene films (thickness: 1,000 μm) were continuously fed to the molding roll die which were close to the base lip and were adhered to the foamed sheet. In this case, the molding roll temperature was 110° C. Immediately after the film adhesion, the foamed body was cooled by passing between cooling rolls which are disposed 100 mm apart from the molding roll.

EXAMPLE 6

40 parts by weight of a propylene-ethylene block copolymer (MI=0.8, and ethylene content: 11 wt %) was mixed with 60 parts by weight of a propylene-ethylene random copolymer (MI=10.0, and ethylene content: 2.3 wt %), and 3 phr of talc were added thereto. The resultant mixture was extruded by a vent type extruder while nitrogen gas was supplied at a pressure of 30 kg/cm$^2$ to a vent portion, by using a 1460 mm wide base and the apparatus shown in FIGS. 1 and 2. A molding roll die having an outer diameter of 20 mm was disposed such that a distance between the apex of the lip and the roll's sheet contact line was set at 7 mm, thereby extrusion-molding a foamed sheet. The resultant sheet had a thickness of 3 mm, and a smooth surface. The foamed sheet had uniform fine cells and an expansion ratio of 3 and was flat.

COMPARATIVE EXAMPLE 1

15 parts by weight of a propylene-ethylene block copolymer (MI=0.8, and ethylene content: 11 wt %) was mixed with 85 parts by weight of a propylene-ethylene random copolymer (MI=10.0, and ethylene content: 2.3 wt %). Following the same procedures as in Example 6, a foamed sheet was extrusion-molded. Cells on the surface of the sheet were broken during extrusion molding. The foamed sheet had a thickness of 1.5 mm, an expansion ratio of 1.7, and a rough surface.

COMPARATIVE EXAMPLE 2

90 parts by weight of a propylene-ethylene block copolymer (MI=0.8, and ethylene content: 11 wt %) was mixed with 10 parts by weight of a propylene-ethylene random copolymer (MI=10.0, and ethylene content: 2.3 wt %). Following the same procedures as in Example 6, a foamed sheet was extrusion-molded. The surface of the resultant foamed sheet was rough, i.e., had poor smoothness. The foamed sheet had an expansion ratio of 2.4 and nonuniform cells, and was brittle.

COMPARATIVE EXAMPLE 3

Figure 5:
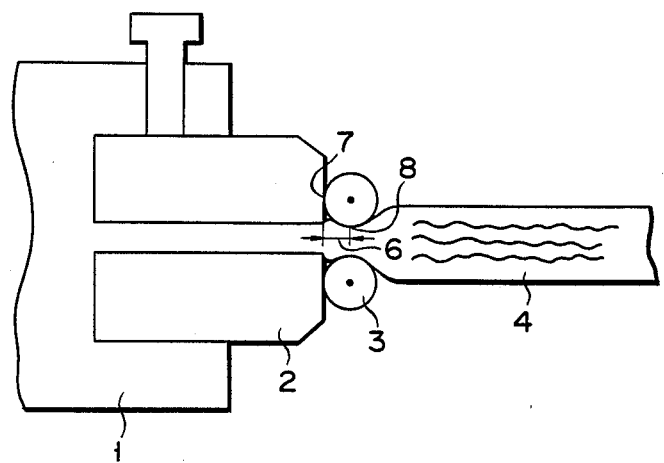
FIG. 5 is a side view showing the main part of a conventional apparatus for manufacturing a foamed sheet.

3 phr of talc was added to a resin composition as in Example 6, and the resultant mixture was extruded by a vent type extruder while carbon dioxide gas was supplied to a vent portion at a pressure of 24 kg/cm$^2$. A flat base without a tapered apex as shown in FIG. 5 and rolls each having an outer diameter of 50 mm and a width of 900 mm were used to obtain a foamed sheet. Vertical wave-like wrinkles formed during foaming were not eliminated. The foamed sheet had poor smoothness like a wooden texture, a thickness of 2.5 mm, and an expansion ratio of 3.8.

What is claimed is:

1. A method of manufacturing a foamed polypropylene resin sheet, wherein use is made of a composition comprising as a resin component a mixture of 80 to 20 wt % of a crystalline propylene-ethylene block copolymer containing not more than 20 wt % of ethylene and having a melt index (MI) of not more than 2 and 20 to 80 wt % of a crystalline propylene-ethylene block or random copolymer containing not more than 5 wt % of ethylene and having an MI of 6 to 20 or a polypropylene homopolymer having an MI of 6 to 20; and a foaming agent said method comprising:

horizontally arranging a pair of molding roll dies at a point separated from a center of an apex of an extrusion foaming die, such that a distance between the center of a roll of the molding roll die and an apex of a base lip is set to fall within a range of $(R^2+25)^{\frac{1}{2}}$ to $(R^2+144)^{\frac{1}{2}}$ *where R is a radius of the molding roll die*;

extrusion-molding the composition into a foamed sheet without collapsing while a fluid is supplied to the interiors of the rolls so that a surface temperature of the foamed sheet passing between the molding rolls is set at not more than 105° C.;

and cooling an extrusion-molded foamed sheet.

2. A method according to claim 1, wherein the composition contains as the resin component 60 to 30 wt % of a crystalline propylene-ethylene block copolymer containing not more than 20 wt % of ethylene and having a melt index of not more than 2 and 40 to 70 wt % of a crystalline propylene-ethylene block or random copolymer containing not more than 5 wt % of ethylene and having a melt index of 6 to 20.

3. A method according to claim 1, wherein the composition contains as the resin component 60 to 30 wt % of a crystalline propylene-ethylene block copolymer containing not more than 20 wt % of ethylene and having a melt index of not more than 1 and 40 to 70 wt % of a crystalline propylene-ethylene block or random copolymer containing not more than 5 wt % of ethylene and having a melt index of 6 to 15.

4. A method according to claim 1, wherein the foaming agent is at least one material selected from the group consisting of a volatile foaming agent, an inert gas, and a heat decomposable foaming agent and is used in an amount within a range of 0.1 to 30 parts by weight with respect to 100 parts by weight of the resin component.

5. A method according to claim 4, wherein the volatile foaming agent is a hydrocarbon selected from the group consisting of lower aliphatic hydrocarbon and halogenated hydrocarbon.

6. A method according to claim 1, wherein the foaming agent is an inert gas.

7. A method according to claim 1, wherein the foaming agent is a gas selected from the group consisting of carbon dioxide gas, nitrogen gas, and a mixture thereof.

8. A method according to claim 1, wherein the pair of molding roll dies disposed near the extrusion foaming die has a radius of 30 to 50 mm each.

9. A method according to claim 1, wherein a distance between a center of each molding roll die nearest to the extrusion foaming die and a corresponding cooling roll as a second roll is set at not more than 500 mm.

10. A method according to claim 1, wherein the molding roll dies nearest to the extrusion foaming die are supported by auxiliary rolls so as to prevent deformation of the molding roll dies.

11. A method according to claim 1, wherein a material selected from the group consisting of a thermoplastic resin film, a metal film, an unwoven fabric, and paper is continuously fed to one or both of the molding roll dies and is adhered to a surface of an extruded foamed sheet, thereby obtaining the laminated foamed sheet.

* * * * *